(12) United States Patent
Raj et al.

(10) Patent No.: US 10,394,299 B2
(45) Date of Patent: Aug. 27, 2019

(54) SYSTEMS AND METHODS TO SEPARATE POWER DOMAINS IN A PROCESSING DEVICE

(71) Applicant: QUALCOMM Incorporated, San Diego, CA (US)

(72) Inventors: Satish Raj, San Diego, CA (US); Shiva Ram Chandrasekaran, San Diego, CA (US); Li Qiu, Palo Alto, CA (US); Arun Tyagi, San Diego, CA (US); Mathew Philip, San Francisco, CA (US); Rajesh Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 15/162,371

(22) Filed: May 23, 2016

(65) Prior Publication Data

US 2017/0336845 A1 Nov. 23, 2017

(51) Int. Cl.
*G06F 1/28* (2006.01)
*G06T 1/20* (2006.01)
(Continued)

(52) U.S. Cl.
CPC ............ *G06F 1/28* (2013.01); *G06F 17/5072* (2013.01); *G06F 17/5077* (2013.01); *G06T 1/20* (2013.01);
(Continued)

(58) Field of Classification Search
CPC .... G06F 1/28; G06F 17/5072; G06F 17/5077; G06F 2217/78; G06T 1/20;
(Continued)

(56) References Cited

U.S. PATENT DOCUMENTS 4,627,152 A   12/1986   Dehond et al.
5,646,548 A   7/1997    Yao et al.
(Continued)

FOREIGN PATENT DOCUMENTS

EP    3051448 A1    8/2016
JP    105109897 A   4/1993
(Continued)

OTHER PUBLICATIONS

Hong Y-S., et al., "Analysis of Power Delivery Network Constructed by Irregular-Shaped Power/Ground Plane Including Densely Populated Via-Hole", IEEE Transactions on Advanced Packaging, May 1, 2005, vol. 28, No. 2, XP011131542, ISSN: 1521-3323, DOI: 10.1109/TADVP.2005.846949, pp. 168-173.
(Continued)

*Primary Examiner* — Austin Hicks
(74) *Attorney, Agent, or Firm* — Haynes and Boone, LLP (36340)

(57) ABSTRACT

A system includes a processing core built on a semiconductor substrate, the processing core having a first sub core and a second sub core, each of the first and second sub cores configured to perform a processing function, and a plurality of power rails traversing a dimension of the processing core and spanning from the first sub core to the second sub core, each of the power rails being configured to provide an operating voltage to the first and second sub cores, and wherein a boundary between the first sub core and the second sub core is irregularly shaped, and wherein each of the first and second sub cores corresponds to a respective power domain.

23 Claims, 11 Drawing Sheets

(51) Int. Cl.
  *G06F 17/50* (2006.01)
  *H01L 23/525* (2006.01)
  *H01L 23/528* (2006.01)
  *H01L 27/118* (2006.01)
  *H01L 27/02* (2006.01)

(52) U.S. Cl.
  CPC ........ *H01L 23/525* (2013.01); *H01L 23/5286* (2013.01); *G06F 2217/78* (2013.01); *G06T 2200/28* (2013.01); *H01L 27/0207* (2013.01); *H01L 2027/11881* (2013.01)

(58) Field of Classification Search
  CPC ............... G06T 2200/28; H01L 23/525; H01L 23/5286; H01L 27/0207; H01L 2027/11881
  See application file for complete search history.

(56) References Cited

U.S. PATENT DOCUMENTS

| | | | |
|---|---|---|---|
| 6,455,902 | B1 | 9/2002 | Voldman |
| 6,818,929 | B2 | 11/2004 | Tsutsumi et al. |
| 8,336,018 | B2 | 12/2012 | Turner et al. |
| 8,423,946 | B1 | 4/2013 | Jin et al. |
| 9,184,123 | B1 * | 11/2015 | Liu .................. H01L 23/49827 |
| 9,437,591 | B1 * | 9/2016 | Nidhi .................. H01L 27/0262 |
| 2001/0036108 | A1 | 11/2001 | Takano |
| 2004/0036363 | A1 | 2/2004 | Sarig et al. |
| 2005/0091629 | A1 * | 4/2005 | Eisenstadt ............ G06F 17/505 326/81 |
| 2009/0039952 | A1 | 2/2009 | Wang et al. |
| 2010/0042858 | A1 | 2/2010 | Padhye et al. |
| 2010/0165522 | A1 | 7/2010 | Stockinger et al. |
| 2010/0205572 | A1 * | 8/2010 | Dai .................... G06F 17/5018 716/120 |
| 2012/0060138 | A1 | 3/2012 | Singh et al. |
| 2013/0015882 | A1 | 1/2013 | Datta et al. |
| 2013/0174113 | A1 | 7/2013 | Lecler et al. |
| 2014/0292756 | A1 * | 10/2014 | Mantor ................. G06T 15/005 345/426 |
| 2015/0091633 | A1 | 4/2015 | Tsuchiya et al. |
| 2015/0143309 | A1 | 5/2015 | De Dood et al. |
| 2015/0178204 | A1 * | 6/2015 | Ray ........................... G11C 5/04 711/103 |
| 2017/0336840 | A1 | 11/2017 | Sahu et al. |

FOREIGN PATENT DOCUMENTS

| | | |
|---|---|---|
| JP | 2003152081 A | 5/2003 |
| JP | 2004172601 A | 6/2004 |
| JP | 2007201414 A | 8/2007 |
| JP | 2007227625 A | 9/2007 |
| WO | WO-2006062505 A1 | 6/2006 |
| WO | 2006114875 A1 | 11/2006 |

OTHER PUBLICATIONS

International Search Report and Written Opinion—PCT/US2017/027961—ISA/EPO—Sep. 29, 2017 (160492U1WO).
Lee C-J., et al., "Hierarchical Power Network Synthesis for Multiple Power Domain Designs", 13th International Symposium on Quality Electronic Design (ISQED), Mar. 19, 2012, XP032169402, DOI:10.1109/ISQED.2012.6187536, ISBN: 978-1-4673-1034-5, pp. 477-482.
Kim J-H., et al., "Modeling of Irregular Shaped Power Distribution Planes Using Transmission Matrix Method," IEEE Transactions on Advanced Packaging, Aug. 2001, vol. 24 (3), pp. 334-346.
Piccioni S., "Real Design Challenges of Low Power Physical Design Implementation," May 15, 2007, 33 slides.
Swaminathan M., et al., "Power Distribution Networks for System-on-Package: Status and Challenges," IEEE Transactions on Advanced Packaging, May 2004, vol. 27 (2), pp. 286-300.
Wilton S.J.E., et al., "Programmable Logic IP Cores in SoC Design: Opportunities and Challenges," IEEE Conference on Custom Integrated Circuits, 2001, pp. 63-66.
Anonymous: "Encounter User Guide, Product Version 7.1.2, Chapter 10: Low Power Design", May 30, 2008, XP055395027, Retrieved from the Internet: URL:http://w1npp.org/wx1gyx.org/topics/SKYWAR~1/LDSPED/565893~2.PDF, [retrieved on Aug. 1, 2017], pp. 367-432.

* cited by examiner

SYSTEMS AND METHODS TO SEPARATE POWER DOMAINS IN A PROCESSING DEVICE

TECHNICAL FIELD

This application relates to processing device design and, more specifically, to separating sub cores and power domains in a processing device.

BACKGROUND

A mobile computing device, such as a smart phone, contains a multi-core chip to provide computing power. Examples of processing cores include a Digital Signal Processor (DSP) core, a Graphics Processing Unit (GPU), a Central Processing Unit (CPU), a modem, and a camera core. Each core may have multiple sub cores. For instance, a GPU may include shaders and accumulators as sub cores, a DSP and a CPU may each include different processing units as sub cores.

Furthermore, each of the different sub cores may belong to a separate power domain. As an illustration, a core may be programmed to save power consumption by reducing a voltage to a sub core or turning power off altogether for a sub core that is not in use at a given time. When that sub core is in use, the processor restores full power to that sub core. In other words, each of the different sub cores are powered independently and may be turned on and off independently.

In one conventional example, each of the different sub cores is shaped as a rectangle or rectilinear shape. During design of the core, each of the different sub cores belongs to a different team, and each team is assigned a particular shape to work with so that the different sub cores may be placed together. Each team designs its sub core to fit the shape it is given, with the goal that the shapes should fit together in the final product. These well-defined rectangles or rectilinear shapes, separated from each other by some amount of area, simplify power domain partitioning. However, the space between the shapes may sometimes be considered wasted, whereas space on a semiconductor die is valued highly as miniaturization of devices is a priority in some applications.

Furthermore, the design process including assigning design teams to particular shapes can be well compartmentalized and efficient, but it may require multiple iterations when one or more of the design teams determines that the shape it is given may not allow it to meet constraints. Constraints include, e.g., data timing constraints and power constraints. The iterations may require negotiations among the different design teams and a manager of the core project. After several iterations, the design may be ready to be assembled together and to be taped out.

There is currently a need for a design that is more efficient with respect to space between cores and for a design process that is more efficient and has fewer iterations.

SUMMARY

Various embodiments include systems and methods that implement sub cores using irregular shapes on a processing device. Such irregular shapes may be facilitated by the use of power breaker cells, which provide discontinuities within power rails so as to separate and different power domains.

In one embodiment, a system includes a processing core built on a semiconductor substrate, the processing core having a first sub core and a second sub core, each of the first and second sub cores configured to perform a processing function, and a plurality of power rails traversing a dimension of the processing core and spanning from the first sub core to the second sub core, each of the power rails being configured to provide an operating voltage to the first and second sub cores, and wherein a boundary between the first sub core and the second sub core is irregularly shaped, and wherein each of the first and second sub cores corresponds to a respective power domain.

In another embodiment, a semiconductor device includes a plurality of processing cores, a first one of the processing cores having a first sub core and a second sub core, a plurality of power rails spanning from the first sub core to the second sub core, and a plurality of cells defining a boundary between the first sub core and the second sub core at the power rails, each of the cells providing a discontinuity in a respective power rail; wherein the boundary between the first sub core and the second sub core is irregular, and wherein the first sub core and the second sub core are configured to be independently power collapsible.

In another embodiment, a semiconductor chip has a processing core, the processing core including a first sub core, a second sub core, means for distributing power to the first sub core and the second sub core, and means for providing discontinuities in the power distributing means, wherein a boundary between the first sub core and the second sub core is irregularly shaped and defined by the discontinuity providing means abutting the first core and the second core.

In yet another embodiment, a method includes: power collapsing a first sub core while providing power to a second sub core, wherein the first sub core and the second sub core are implemented in a processing core on a semiconductor chip, wherein a boundary between the first sub core and the second sub core is irregularly shaped and includes a plurality of cells providing discontinuities in a plurality of power rails that span the first sub core and second sub core; and power collapsing the second sub core independently of power collapsing the first sub core.

DETAILED DESCRIPTION

Figure 1:
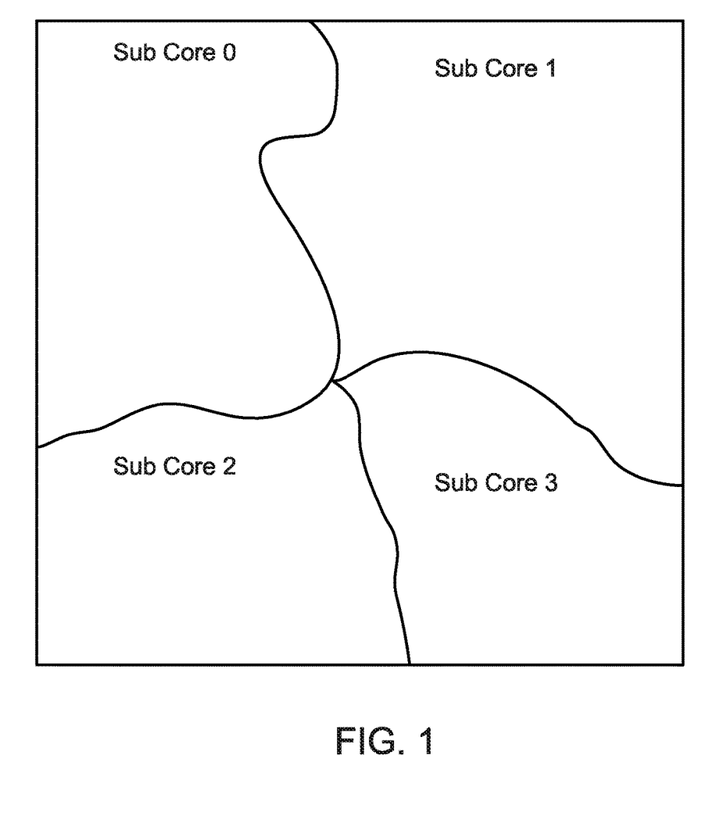
FIG. 1 is a simplified diagram illustrating an example processing core having multiple sub cores, according to one embodiment.

Various embodiments provide for irregularly shaped sub cores within a core, where each of those sub cores is independently powered. An example is shown in FIG. 1. This is in contrast to the strictly rectangular or rectilinear shapes of conventional sub cores.

The shapes of the sub cores are facilitated by the use of power breaker cells. The power breaker cells, during the design phase, include standard library cells that provide discontinuities in a power rail. For example, many power rails may traverse a dimension of the core and intersect multiple ones of the sub cores. At a boundary between one sub core and another sub core, the power breaker cells define that boundary at least at the power rails.

Each of the power breaker cells abuts two sub cores, and the sub cores are in separate power domains. The discontinuities provided by the power breaker cells allow each sub core to be powered separately. Accordingly, the processor core may power down one or more of the sub cores at a given time and independently of other sub cores.

Continuing with the example, various embodiments include designs for the power breaker cells themselves. One example embodiment includes a power breaker cell that is relatively narrow—either two or three grid units, though the scope of embodiments is not limited to any particular width. The power breaker cell includes two power rail contacts for VDD with a discontinuity between them, and it provides discontinuities within multiple metal layers. The power breaker cell also includes at least one contact for ground or VSS. The power breaker cell may be implemented so that its two power rail contacts for VDD are built within the same N well. Furthermore, the power rail contacts may omit a physical electrical coupling to the N well within the boundaries of the power breaker cell.

Various embodiments may provide advantages over conventional solutions. For instance, a design having irregular boundaries for sub cores may reduce the space between those sub cores because the irregular shapes are not forced to fit within a prescribed rectangle or rectilinear shape. Thus, area of the chip can be used more efficiently.

FIG. 1 is a simplified diagram illustrating an example processing core having multiple sub cores. The outside rectangle shape in FIG. 1 represents the core, and the irregular shapes labeled sub core 0 . . . sub core 3 are the sub cores. Of note in FIG. 1 is that the sub cores are not rectangular shaped, nor are they rectilinear shaped. Instead, the shapes of the sub cores simply conform to the boundaries of each other and to the core as a whole, thereby creating various irregular shapes. This is markedly different from conventional sub core layouts, wherein each of the sub cores is rectangular shaped or rectilinear shaped.

Continuing with the example, each of the different sub cores corresponds to a different power domain so that the sub cores are powered independently. In this example, the power domain boundaries conform to the irregular shapes of the sub core boundaries by use of standard cells that create a discontinuity in the power rails of the cores. For instance, power rail structures extend laterally (horizontal in this example) from one side of the core to the other and traversing multiple sub cores. Power rails are implemented in the metal layers of the semiconductor device, and a given rail may include a power and a ground or a power and a complementary power. Various embodiments may place discontinuities in a power rail structure by including power breaker cells. An example of a power breaker cell is shown in FIG. 2.

Figure 2:
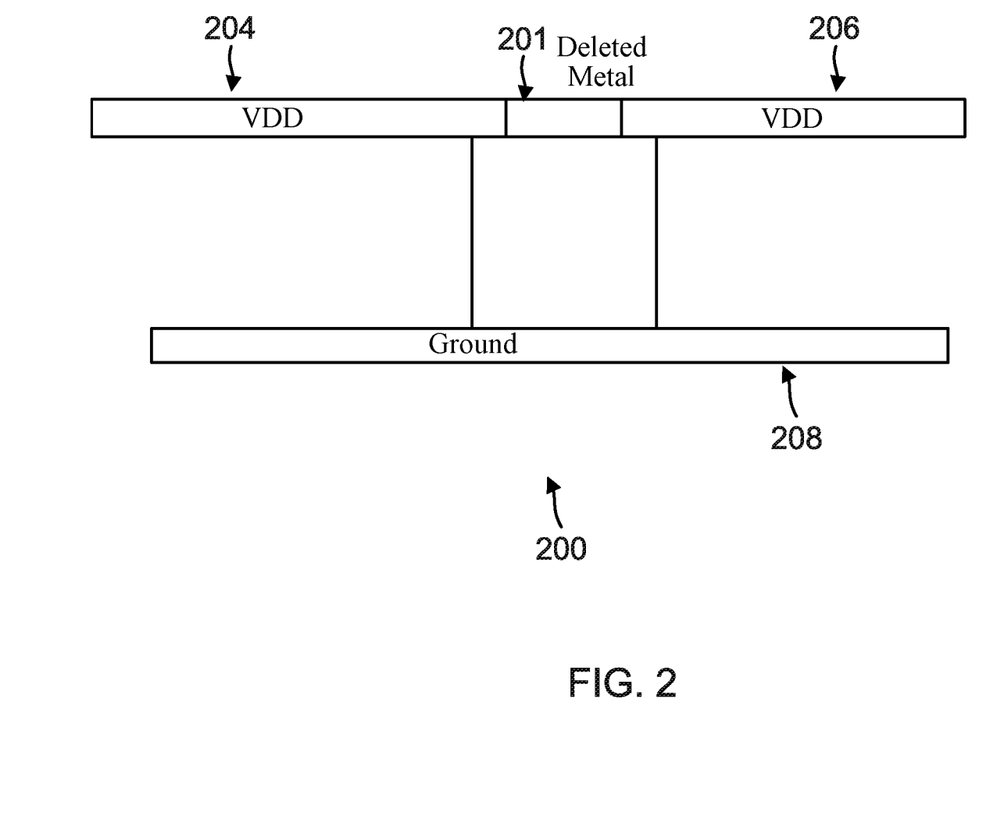
FIG. 2 is a simplified diagram of a power breaker cell adapted according to one embodiment.

FIG. 2 is a simplified diagram of a power breaker cell 200 adapted according to one embodiment. The power breaker cell 200 may be used to create discontinuities in the power rails at the boundaries of the sub cores of FIG. 1.

FIG. 2 includes a portion of a single power rail structure, and it is understood that the core of FIG. 1 would include numerous power rail structures extending across its lateral dimension. The power breaker cell 200 is a standard cell, and it is at a level of granularity corresponding to a gate, such as an AND gate. When it is manufactured, power breaker cell 200 includes a deleted portion of metal 201 in the power rail structure. In the example of FIG. 1, the irregular boundaries between one sub core and another sub core include power breaker cells that make power rails discontinuous at the boundaries. A given boundary may include hundreds or thousands of power breaker cells. In the example of FIG. 2, the design would further include the left VDD rail 204 in communication with a first source of power and the right VDD rail 206 in communication with a second source of power so that each power domain may be turned on or off independently. As shown, the ground rail 208 is not broken by power breaker cell 200, however in some embodiments, other power breaker cells may break ground rails as well.

The design process for the core of FIG. 1 is different from the conventional design process applied to conventional cores. For example, the design process for conventional cores would include rectilinear shapes being assigned to each of the different sub cores, with different teams working on each of the different sub cores. If an assigned shape prevents a particular sub core from complying with a constraint, then the rectilinear shape may be changed through an iterative process of negotiation with teams for other sub cores and a core manager. By contrast, the design process for the core of FIG. 1 dispenses with the assigned rectilinear shapes at the beginning and includes a team working to lay out the sub cores together within the large rectangular shape of the core itself. Power breaker cells may be placed late in the design process and may even be moved during later iterations of the design process as appropriate. This is described in more detail with respect to FIG. 10. An advantage of the design process of the core of FIG. 1 is that it may result in fewer iterations because the shapes of the individual sub cores are less constrained. Another advantage of the design process of the core of FIG. 1 is that it may reduce the amount of empty space in boundaries between sub cores.

Figure 3:
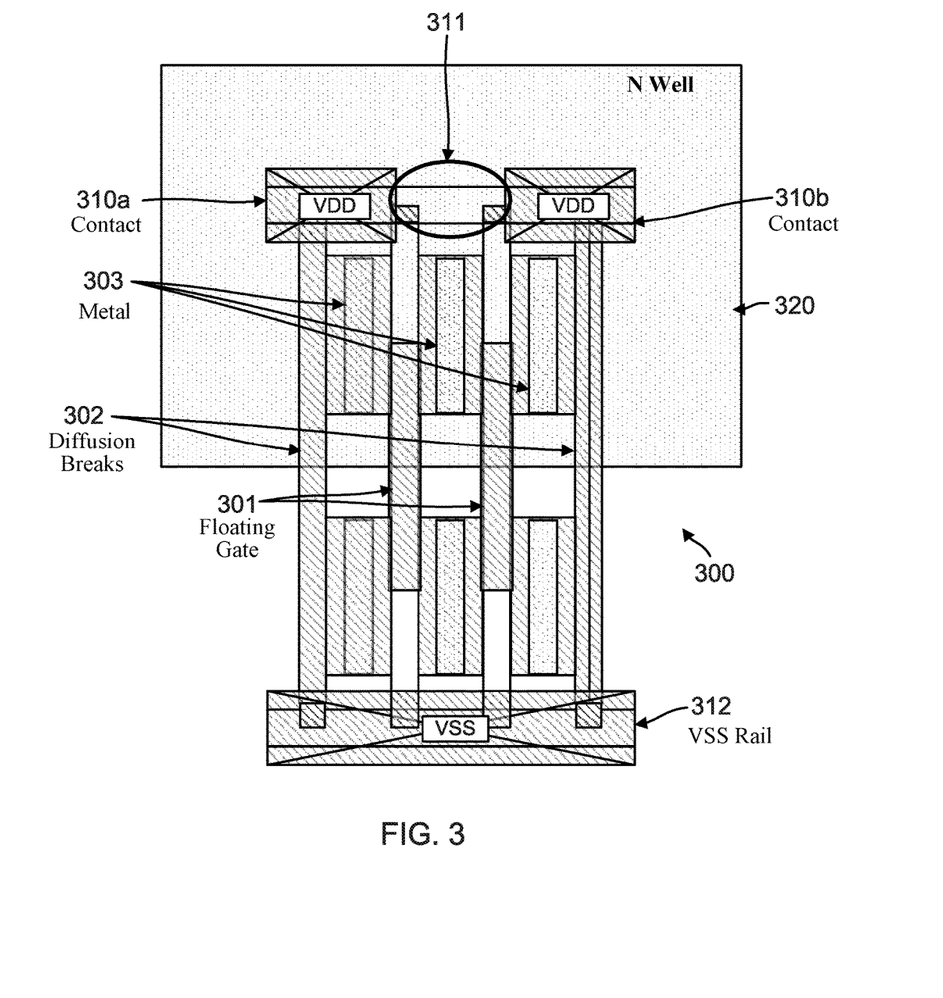
FIG. 3 is an illustration of an example power breaker cell adapted according to one embodiment.

FIG. 3 is an illustration of an example power breaker cell 300 adapted according to one embodiment and shown in more detail than is shown in FIG. 2. Power breaker cell 300 is a 3-grid power breaker cell. VDD rail 310 is divided into two portions—a first VDD contact 310a on the left, and a second VDD contact 310b on the right, similar to rail portions 204 and 206 of FIG. 2. Power breaker cell 300 includes a discontinuity 311 in the VDD rail 310, thereby separating power domains. The VSS rail 312 extends across the lateral dimension of the power breaker cell 300 without a discontinuity. The box labeled 320 is an N well (e.g., and N-type doped region of semiconductor on a P-type substrate), and both VDD contacts 310a and 310b are in the same N well 320. Furthermore, the power breaker cell 300 does not include well tying within the boundaries of the cell, as the VDD contacts 310*a* and 310*b* are not directly in communication with the doped semiconductor material of the N well.

Figure 4:
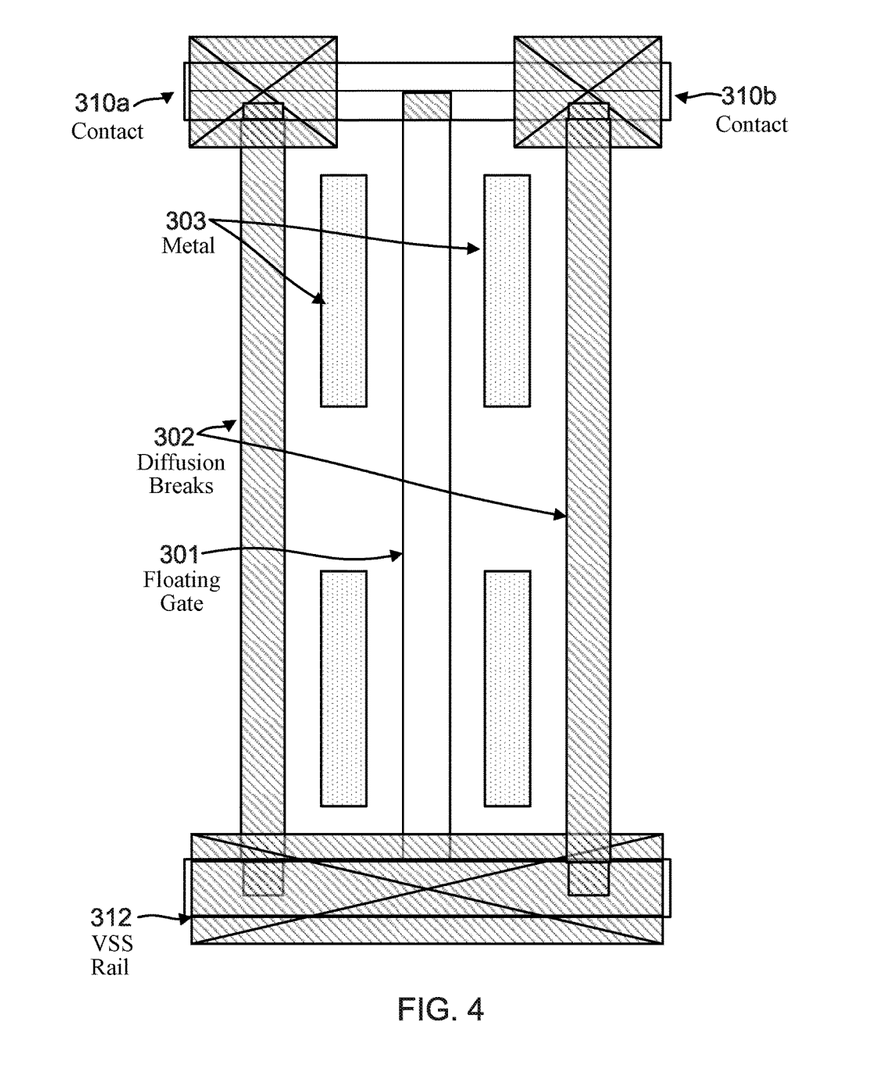
FIG. 4 is an illustration of an example power breaker cell adapted according to one embodiment.

Of course, the scope of embodiments is not limited to a 3-grid power breaker cell. For instance, FIG. 4 is an illustration of an example 2-grid power breaker cell 400 according to one embodiment, and it is substantially similar to the power breaker 300 cell of FIG. 3, though including one fewer grid in its width. The 2-grid power breaker cell 400 also is implemented within a common N well and does not include well tying within the boundaries of the cell.

The power breaker cells 300 and 400 may be fabricated in any appropriate manner and using any appropriate materials. In one example, power breaker cells 300 and 400 include a floating gate 301. Floating gate 301 may include, for instance, a polysilicon gate that is not associated with any transistor. Diffusion breaks 302 are placed along a dimensional extent of the cell and may also be fabricated using polysilicon or other appropriate material to prevent diffusion of ions across the boundary of the power breaker cell. Items 303 include metal structures, which are similar to contacts that would be used at a source or a drain of a transistor, but in this example are not associated with any transistor. The VDD contacts 310*a* and 310*b* and VSS rail 312 are also metal, although they may be constructed in different layers than the metal structures 303.

As noted above, power breaker cells 200, 300, 400 are standard cells in a library. Accordingly, power breaker cells 200, 300, 400 may be embodied as data in a database, where the data describes how to create the cells in a semiconductor wafer. Of course, from another standpoint, power breaker cells 200, 300, 400 may be physically embodied on a semiconductor substrate, whether as part of a wafer or part of a diced chip. FIGS. 3 and 4 illustrate the physical features that may be used in various embodiments, whether described as part of a standard cell or physically implemented in silicon.

Power breaker cells 200, 300, 400 may be used within core designs to separate two sub cores in different power domains. Thus, a given power breaker cell may abut another standard cell on its left and yet another standard cell on its right, where those other standard cells correspond to different sub cores. In such instances, VDD contact 310*a* would be in electrical communication with a VDD rail portion from the left, and VDD contact 310*b* would be in electrical communication with a VDD rail portion from the right. Similarly, VSS rail 312 would be in electrical contact with other VSS rail portions on both the left and the right. In this matter, a given power breaker cell provides an electrical discontinuity in a power rail at a boundary between two sub cores.

Figure 5:
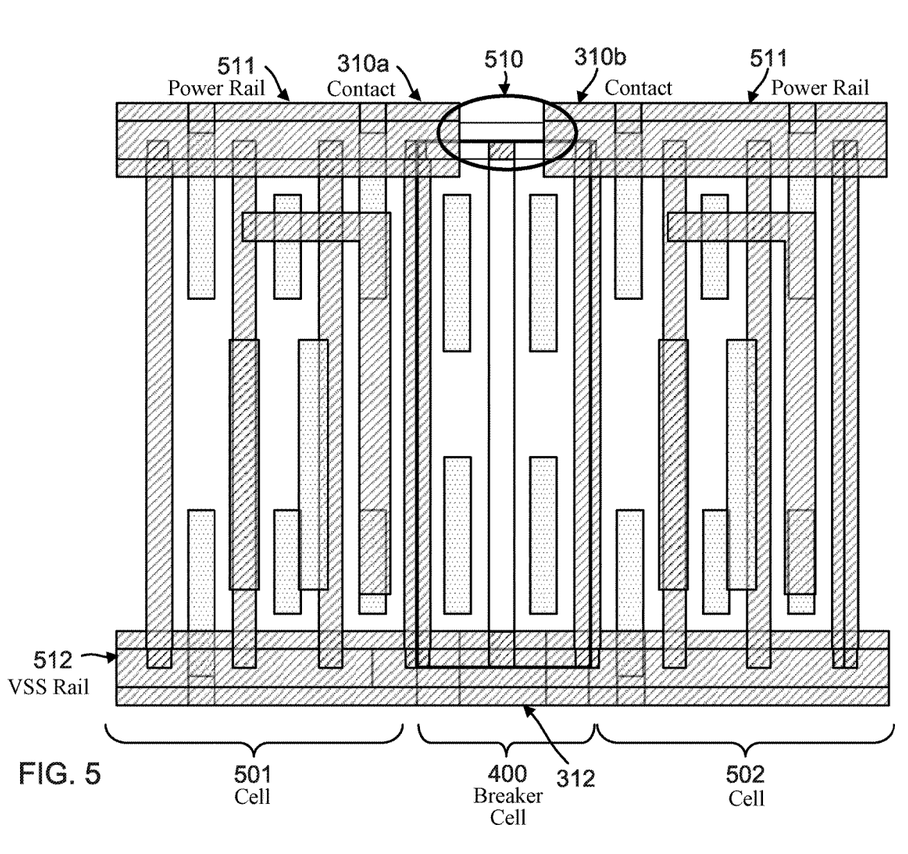
FIG. 5 shows an example implementation, where a power breaker cell abuts other cells at a power domain boundary, according to one embodiment.

FIG. 5 shows an example implementation, in which power breaker cell 400 abuts other cells 501 and 502. There is a discontinuity 510 in the VDD power rail 511, and VDD contacts 310*a* and 310*b* are electrically coupled with the metal of the VDD power rail 511. VSS power rail 512 is continuous for the entire width of the portion shown in FIG. 5, including the portion that is attributable to VSS rail 312.

The cell 501 may be associated with a first sub core in a first power domain, and the cell 502 may be associated with a second sub core in a second power domain. Power breaker cell 400 abuts two power domains and provides the power rail discontinuity 510. Or put another way, power breaker cell 400 represents a border between two sub cores and two power domains. Both VDD power rail 511 and VSS power rail 512 span from one power domain to another and from one sub core to another, with power breaker cell 400 providing a boundary between the sub cores and power domains.

It is understood that a given sub core would include hundreds or thousands of other standard cells, and those additional standard cells are not shown herein. Nevertheless, the border between the two sub cores would extend both above and below the portion shown in FIG. 5. And when viewed at a level of abstraction that allows viewing an entire sub core, the border between the two sub cores would include hundreds or thousands of similar power breaker cells defining an irregular shape of the border.

Figure 6:
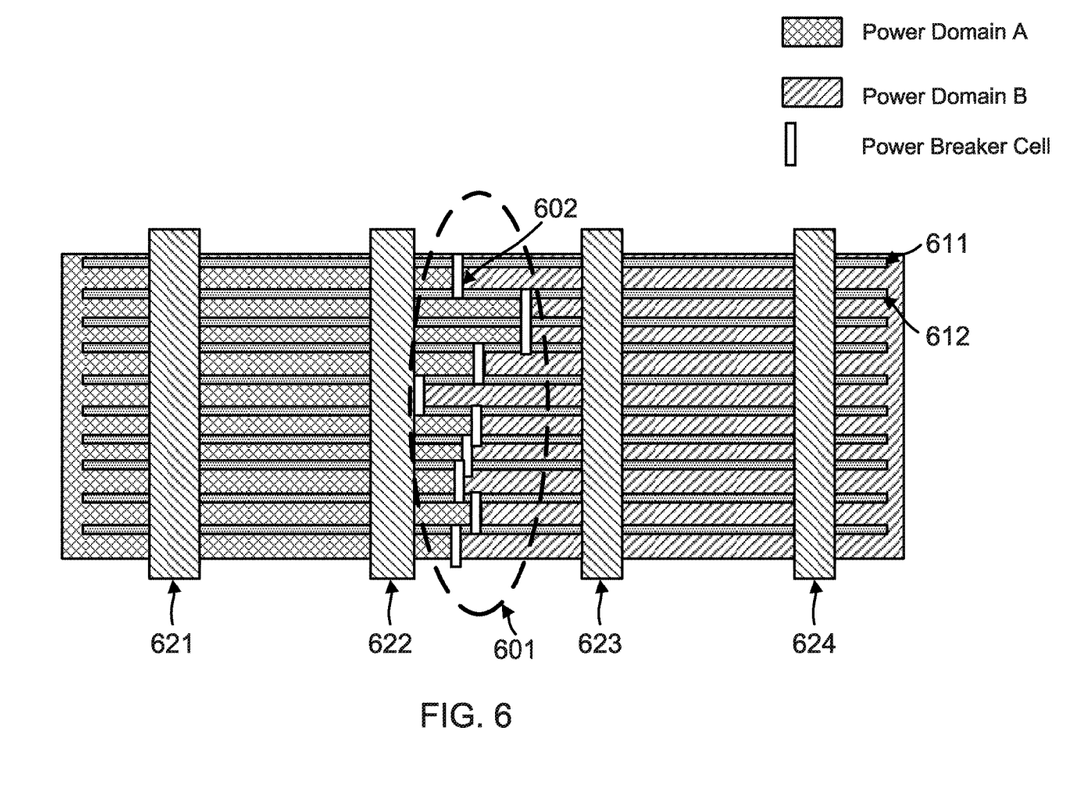
FIGS. 6 and 7 illustrate example implementations, wherein multiple power breaker cells create a border between two separate power domains, according to one embodiment.

FIG. 6 illustrates an example implementation, wherein multiple power breaker cells create a border 601 between two separate power domains, domain A and domain B. An example of power breaker cell is power breaker cell 602, which may be similar to the power breaker cells 200, 300, 400 described above.

The horizontal lines in the FIG. 6 represent VDD and VSS rails. For instance, VDD rail 611 is paired with VSS rail 612, and they are both associated with power breaker cell 602. Power breaker cell 602 provides a discontinuity in VDD rail 611 and may or may not also provide a discontinuity at VSS rail 612.

In this example, power is provided to the power domains A and B by metal straps 621-624 for distribution to the VDD rails. FIG. 6 provides a top-down illustration, and it is understood that metal straps 621-624 are implemented in different metal layers than are the smaller metal lines exemplified by VDD rail 611 and VSS rail 612. The metal straps 621-624 tap to those progressively smaller metal lines exemplified by VDD rail 611 and VSS rail 612 using vias (not shown). Metal straps 621-624 are interconnected to provide a low resistance path for current and to allow for redundancy. For instance, metal straps 621 and 622 belong to power domain A, and they are interconnected by virtue of vias (not shown) that reach different metal layers and couple to smaller metal lines exemplified by VDD rail 611 and VSS rail 612. Similarly, metal straps 624 and 623 belong to power domain B, which are also interconnected by virtue of vias that coupled to the smaller metal lines exemplified by VDD rail 611 and VSS rail 612.

The power breaker cells provide discontinuities at their respective VDD rails (and possibly VSS rails) in one or more metal layers. For instance, in designs that distribute power using two or more metal layers, the power breaker cells may provide discontinuities in those two or more metal layers.

The border 601 between domains A and B takes an irregular shape at this level of abstraction. When looking at the scale of gates themselves, irregularly shaped may appear to be rectilinear, but looking at a scale that is an order of magnitude larger or two orders of magnitude larger than a given gate, the border 601 appears to be irregularly shaped. The view of the boundaries between the sub cores in FIG. 1 highlights the irregular shape. In fact, the view of the border 601 in FIG. 6 may be only a small section of one of the exemplary boundaries of FIG. 1.

Although not shown in FIG. 6, power domain A and power domain B may be in communication with separate power supplies in this embodiment. For instance, a power supply may include a Power Management Integrated Circuit (PMIC), and in some embodiments metal straps 621 and 622 may be in communication with a first PMIC, whereas metal straps 623 and 624 may be in communication with a second PMIC. This is one example of how two different power domains may coexist within a semiconductor device. In another example, a single power supply may provide power to both power domains A and B, and a power distribution network including switches may be implemented between the power supply and the straps 621-624. The switches may be opened and closed to separately power each power domain. The scope of embodiments is not limited to any particular power scheme for power distribution network.

Various embodiments include power collapsing power domains independently of each other. For instance, some power saving techniques include reducing a voltage or removing power altogether to a given sub core (power collapsing) when that sub core is not in use. For instance, when a particular camera sub cores not in use, a power supply may discontinue providing power to that particular sub core, while at the same time providing power to other sub cores, assuming those sub cores are in different power domains. The power breaker cells of FIGS. 2-6 allow for separation of the power domains, thereby allowing sub cores to be powered independently of each other, including power collapsing sub cores independently of each other.

Figure 7:
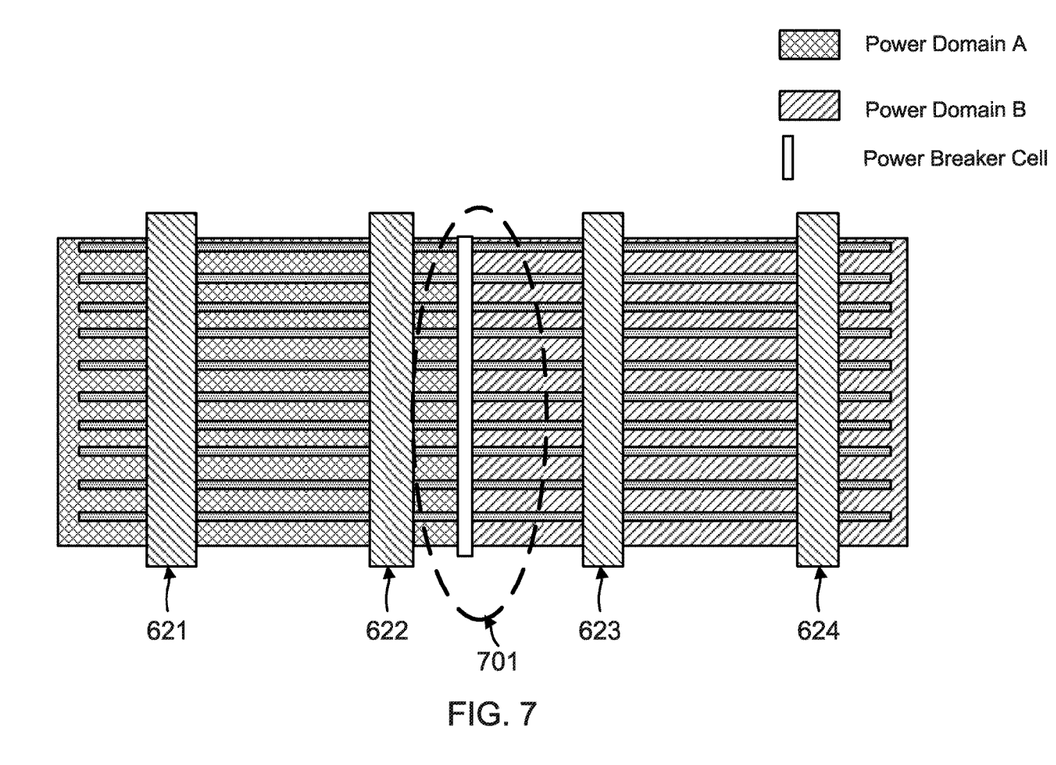

FIG. 7 provides an illustration of another border 701 between power domain A and power domain B, according to one embodiment. For instance, the section of the border 701 shown in FIG. 7 may be part of a larger border that includes the portion shown in FIG. 6 as well, perhaps vertically above or below the view of FIG. 7.

Figure 8:
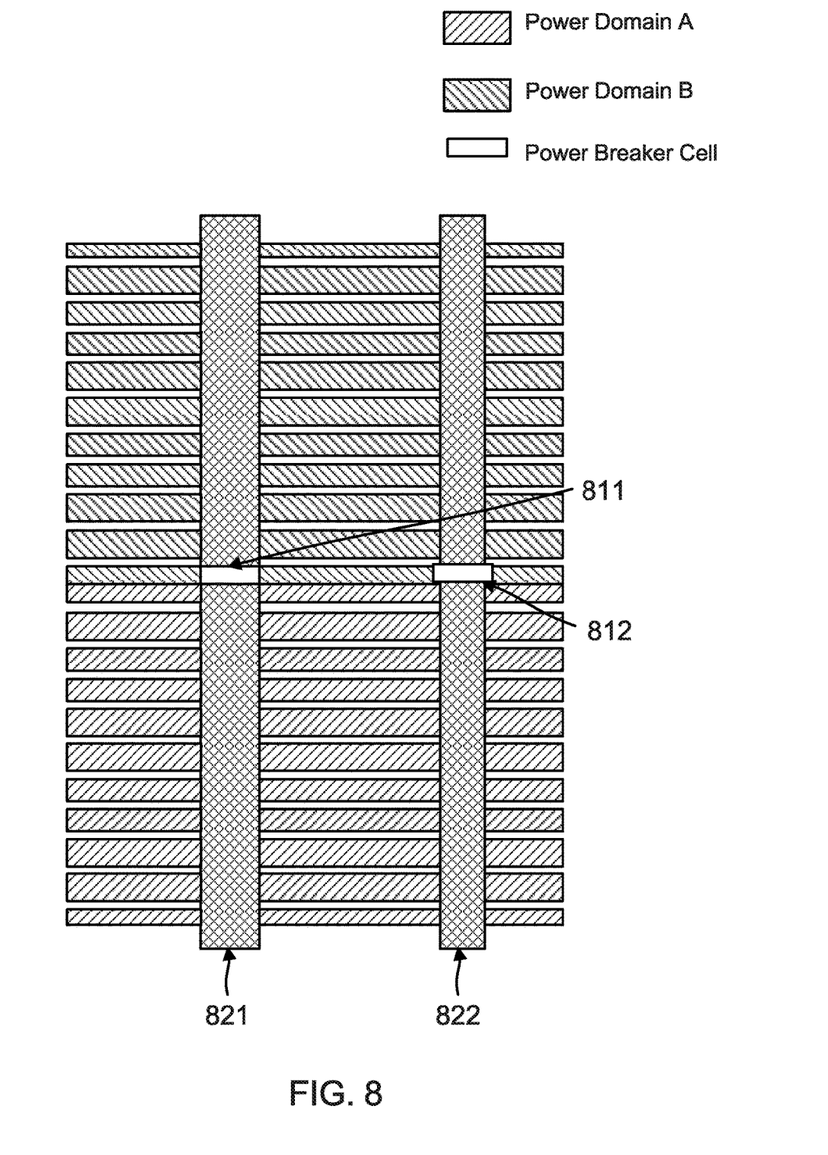
FIG. 8 is an illustration of an example arrangement, wherein power breaker cells provide discontinuities in metal straps, according to one embodiment.

Furthermore, other embodiments may include additionally or alternatively using power breaker cells in metal straps, such as metal straps 621-624. FIG. 8 is an illustration of an example arrangement, wherein power breaker cells 811 and 812 provide discontinuities in metal straps 821 and 822. Taken together, the embodiments of FIGS. 6-8 illustrate that the power breaker cells may be used at any appropriate structure to create a discontinuity in a power or ground rail.

Figure 9:
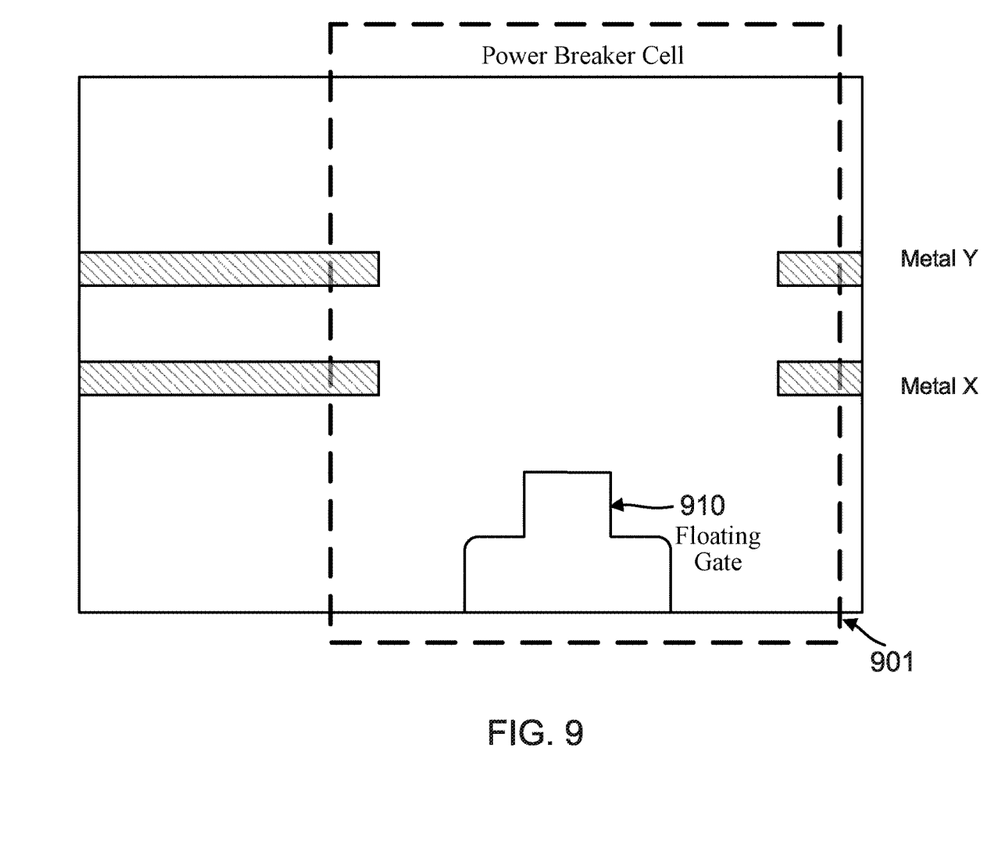
FIG. 9 is an illustration of a power breaker cell 901 implemented in a semiconductor device, according to one embodiment.

FIG. 9 is an illustration of a power breaker cell 901 implemented in a semiconductor device, according to one embodiment. FIG. 9 is a cutaway view from a side of the semiconductor device, showing two metal layers, Metal Y and Metal X disposed within layers of dielectric. Power breaker cell 901 has floating gate 910, and it includes portions of metal that are in Metal Y and Metal X layers. FIG. 9 illustrates that a power breaker cell, as implemented in a semiconductor device, provides discontinuities in one or more metal layers of the semiconductor device. When implemented as a standard cell in a library, the power breaker cell 901 may mark various metal layers as XOR to indicate that those metal layers have discontinuities within the cell. While FIG. 9 shows a discontinuity in two metal layers, it is understood that various semiconductor devices may have a multitude of metal layers, and a given power breaker cell may provide discontinuities in one or more of the metal layers as appropriate to separate power domains.

Figure 10:
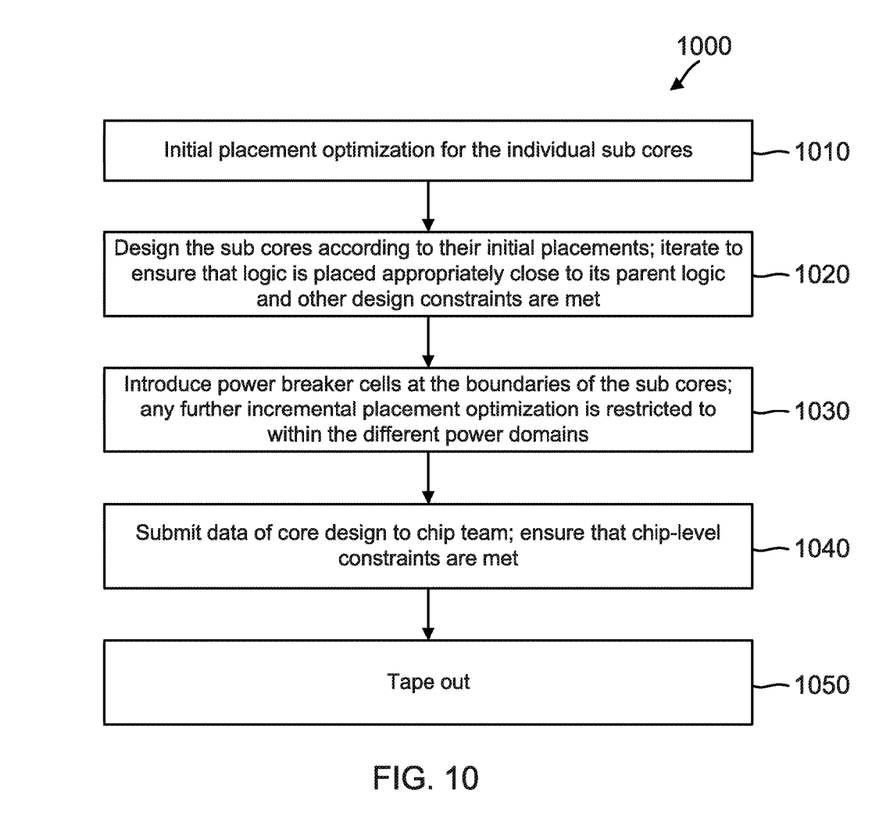
FIG. 10 is an illustration of a flow diagram of an example method of designing a chip using power breaker cells, such as those of FIGS. 2-6, according to one embodiment.

FIG. 10 is a flow diagram of an example method 1000 according to one embodiment. Method 1000 includes a design flow, which may be used by a design team, including a design team for an individual core of the chip as well as a design team for the chip as a whole. Much of the actions described with respect to FIG. 10 may be performed using Electronic Design Automation (EDA) software. The EDA software treats the standard cells as logical entities that describe a physical part of a semiconductor device. During the design process, a team member may select standard cells from a library and instruct the EDA software to place those standard cells at specific places within the design of the semiconductor device.

The product of the EDA software includes one or more computer readable files that describe the structure of the semiconductor device. The one or more computer readable files may be read by tools at a foundry and used during the fabrication process to produce physical semiconductor devices based on the design.

At action 1010, there is initial placement optimization for the individual sub cores. For instance, one or more members of a design team may start with a rough idea about initial placement of the sub cores within the core. For instance, in the design of FIG. 1, sub core zero is at the top right portion of the core, and the other sub cores have their respective places. Such initial placements may be based on prior knowledge of the team regarding general physical shapes of the logic and general timing constraints.

At action 1020, the team designs the sub cores according to their initial placements. Of note at action 1020, the individual sub cores are not assigned to rectilinear shapes. Rather they are merged into a single plan and implemented at a same level. Action 1020 may include iterations to ensure that logic is placed appropriately close to its parent logic and that other design constraints are met. Furthermore, power domain separation is respected, so that portions of logic that belong to a same power domain are placed contiguous with other logic of that same power domain.

Conventional design processes, which would assign sub cores to respective rectilinear shapes, would typically use a greater number of iterations due to fitting the various sub cores to their rectilinear shapes. However, action 1020 eliminates iterations that would otherwise be attributable to fitting the various sub cores into respective rectilinear shapes. The initial placement and the design of the sub cores may be performed by a team or by an individual with assistance from the EDA software. In this example action 1020 omits the conventional practice of dividing each sub core to a separate team.

Once the sub cores are designed and have separate power domain boundaries, action 1030 introduces power breaker cells at the boundaries of the power domains, which are expected to be the same as the boundaries of the sub cores. Of note at action 1030, the power breaker cells are introduced toward the end of the design process for the core. An advantage of various embodiments is that the power breaker cells are standard cells that can be placed easily and conveniently at this stage of the design process and would not be expected to result in substantial redesign. Continuing with action 1030, any further incremental placement optimization is restricted to within the different power domains, although further iterations requiring changes to the boundaries may be achieved by moving the power breaker cells that Mark the boundaries.

At action 1040, it is assumed that the design for the core is substantially complete and should be assembled together with designs for other cores of the chip as a whole. Accordingly, the data of the core design is submitted to the chip team. The chip team ensures that chip-level constraints are met, such as power and timing constraints. It is possible that action 1040 may result in one or more iterations.

Action 1050 includes tape out. Tape out may involve sending one or more design files to a foundry.

The scope of embodiments is not limited to the specific series of actions in FIG. 10. Rather, various embodiments may add, omit, rearrange, or modify one or more actions. For instance, more or fewer iterations may be used during steps 1020-1040 as appropriate.

Various embodiments may include one or more advantages over conventional processes. For instance, to the extent that method 1000 achieves a fewer number of iterations than a conventional design process, that reduction in man-hours means more efficient design and perhaps cost savings. Additionally, boundaries between the different power domains may correspond to the width of a single power breaker cell. This is in contrast to conventional design processes that assign individual sub cores to respective rectilinear shapes, where those rectilinear shapes may be separated by unused space on the chip. Various embodiments herein eliminate wasteful space between sub core rectilinear shapes, thereby reducing semiconductor area. Additionally, embodiments described herein preserve the ability to separately power collapse different sub cores while at the same time minimizing wasted semiconductor area.

Figure 11:
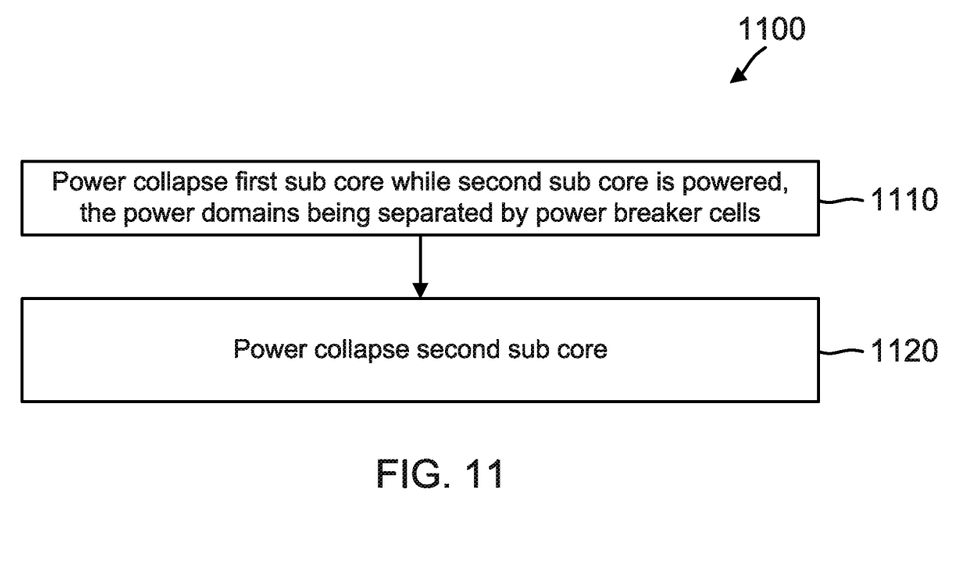
FIG. 11 is an illustration of a flow diagram of an example method of power collapsing sub cores, according to one embodiment.

A flow diagram of an example method 1100 for separately power collapsing sub cores is illustrated in FIG. 11. In one example, method 1100 is performed by a power management logic in a core. For instance, a camera core or other processor core may include power management logic that shuts off power to sub cores during times when those sub cores are not in use. The logic may execute computer readable instructions to perform power collapsing. Power collapsing the sub cores may reduce power consumption that is due to leakage current of individual transistors. Furthermore, power collapsing may be performed as an alternative to or in addition to other power management techniques, such as clock gating and the like.

Method 1100 of FIG. 11 is performed in a core, such as that shown in FIG. 1 having multiple sub cores and irregular boundaries between power domains. The boundaries are provided by power breaker cells, such as those illustrated in FIGS. 2-9. Furthermore, while method 1000 of FIG. 10 (described above) addresses power breaker cells as standard cells used during a design process, method 1100 of FIG. 11 is performed with respect to a chip that has been fabricated and is in use either during testing or during normal operation of the device.

At action 1110, the power management logic power collapses a first sub core while a second sub core is powered. In other words, the power management logic may temporarily stop powering the first one of the sub cores while continuing to provide power to the second one of the sub cores. The two sub cores in this example are adjacent each other and are separated along their boundary by power breaker cells. Despite the discontinuities provided by the power breaker cells, multiple power rails traverse a dimension the core from the first sub core to the second sub core. A given power rail having a discontinuity may provide an operating voltage to the second core while not being powered through its portion within the first core.

At action 1120, the power management logic power collapses the second sub core. At this point, the power management logic may provide power to the first sub core or the first sub core may continue to be power collapsed. In any event, the first and second sub cores are individually power collapsible.

The scope of embodiments is not limited to the specific method shown in FIG. 11. Other embodiments may add, omit, rearrange, or modify one or more actions. For instance, method 1100 may be performed multiple times as the core operates, so that each one of the sub cores may be power collapsed or maybe powered as appropriate. Both of the sub cores may be on at the same time, both of the sub cores may be power collapsed at the same time, or one of the sub cores may be power collapsed as the other receives power. Additionally, method 1100 is described with respect to two sub cores, but it is understood that various embodiments may include two or more sub cores that are individually power collapsible. The scope of embodiments is not limited to any particular number of sub cores. Moreover, the power collapsing and powering up of sub cores of method 1100 may be performed using any appropriate technique, such as opening or closing switches between power supplies and the individual sub cores, turning power supplies on or off, and the like.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
   a processing core built on a semiconductor substrate, the processing core having a first sub core and a second sub core, each of the first and second sub cores configured to perform a processing function; and
   a plurality of power rails traversing a dimension of the processing core and spanning from the first sub core to the second sub core, each of the power rails being configured to provide an operating voltage to the first and second sub cores, and
   a plurality of power breaking cells defining a boundary between the first and second sub cores at points where the power rails span from the first sub core to the second sub core,
   wherein the boundary between the first sub core and the second sub core is irregularly shaped, and
   wherein each of the first and second sub cores corresponds to a respective power domain, and wherein each power rail includes a conductive line for ground (VSS) and a conductive line for power source (VDD), wherein the conductive lines for VDD include discontinuities provided by the power breaking cells, wherein each of the discontinuities includes a floating gate and a doped region.

2. The system of claim 1, wherein the boundary is irregularly shaped at a level of abstraction an order of magnitude larger than a width of the power breaking cells.

3. The system of claim 1, wherein each of the power breaking cells abuts a first cell corresponding to the first sub core and a second cell corresponding to the second sub core.

4. The system of claim 1, wherein the processing core comprises an item selected from the list consisting of:
   a camera core;
   a modem;
   a Digital Signal Processor (DSP); and
   a Central Processing Unit (CPU).

5. The system of claim 1, wherein the processing core comprises a Graphics Processing Unit (GPU), and wherein the first sub core comprises a shader unit, and wherein the second sub core comprises an accumulator unit.

6. The system of claim 1, wherein the respective power domains correspond to separate power supplies.

7. The system of claim 1, wherein the respective power domains correspond to a same power supply, the system further comprising a first switch coupling the power supply to the first sub core and a second switch coupling the power supply to the second sub core.

8. The system of claim 1, wherein a first power rail of the plurality of power rails includes a first power breaking cell of the plurality of power breaking cells, further wherein the first power breaking cell includes two VDD contacts separated by a first one of the discontinuities and built in a same N-type doped region on the semiconductor substrate, and the two VDD contacts are physically separated from doped material of the N-type doped region.

9. A semiconductor device comprising:
a plurality of processing cores, a first one of the processing cores having a first sub core and a second sub core;
a plurality of power rails spanning from the first sub core to the second sub core; and
a plurality of cells defining a boundary between the first sub core and the second sub core at the power rails, each of the cells providing a discontinuity in a respective power rail;
wherein the boundary between the first sub core and the second sub core is irregular, and wherein the first sub core and the second sub core are configured to be independently power collapsible and, wherein each power rail includes a conductive line for ground (VSS) and a conductive line for power source (VDD), wherein the conductive lines for VDD include discontinuities provided by the cells, wherein each of the discontinuities includes a floating gate and a doped region.

10. The semiconductor device of claim 9, wherein the boundary is irregularly shaped at a level of abstraction an order of magnitude larger than a width of the cells.

11. The semiconductor device of claim 9, wherein each of the cells abuts the first sub core and the second sub core.

12. The semiconductor device of claim 9, wherein the first one of the processing cores comprises an item selected from the list consisting of:
a camera core;
a modem;
a Digital Signal Processor (DSP); and
a Central Processing Unit (CPU).

13. The semiconductor device of claim 9, wherein the first one of the processing cores comprises a Graphics Processing Unit (GPU), and wherein the first sub core comprises a shader unit, and wherein the second sub core comprises an accumulator unit.

14. The semiconductor device of claim 9, wherein the first sub core and the second sub core are on separate power domains.

15. The semiconductor device of claim 14, wherein the separate power domains correspond to separate power supplies.

16. The semiconductor device of claim 9, wherein a first power rail of the plurality of power rails includes a first cell of the plurality of cells, further wherein the first cell includes two VDD contacts separated by a first one of the discontinuities and built in a same N-type doped region on a substrate of the semiconductor device, and the two VDD contacts are physically separated from doped material of the N-type doped region.

17. A semiconductor chip having a processing core, the processing core comprising:
a first sub core;
a second sub core;
means for distributing power to the first sub core and the second sub core; and
means for providing discontinuities in the power distributing means, wherein a boundary between the first sub core and the second sub core is irregularly shaped and defined by the discontinuity providing means abutting the first core and the second core, wherein the power distributing means comprise a plurality of power rails, and wherein the discontinuity providing means comprise a plurality of power breaking cells defining the boundary at points where the power rails span from the first sub core to the second sub core, and wherein each power rail includes a conductive line for ground (VSS) and a conductive line for power source (VDD), wherein the conductive lines for VDD include discontinuities provided by the power breaking cells, wherein each of the discontinuities includes a floating gate and a doped region.

18. The semiconductor chip of claim 17, wherein the boundary is irregularly shaped at a level of abstraction an order of magnitude larger than a width of the power breaking cells.

19. The semiconductor chip of claim 17, wherein each of the power breaking cells abuts a first cell corresponding to the first sub core and a second cell corresponding to the second sub core.

20. The semiconductor chip of claim 17, wherein the processing core comprises an item selected from the list consisting of:
a camera core;
a modem;
a Digital Signal Processor (DSP); and
a Central Processing Unit (CPU).

21. The semiconductor chip of claim 17, wherein the processing core comprises a Graphics Processing Unit (GPU), and wherein the first sub core comprises a shader unit, and wherein the second sub core comprises an accumulator unit.

22. The semiconductor chip of claim 17, wherein the first sub core and the second sub core are in separate and different power domains, and further wherein the separate power domains correspond to separate power supplies.

23. The semiconductor chip of claim 17, wherein a first power rail of the plurality of power rails includes a first power breaking cell of the plurality of power breaking cells, further wherein the first power breaking cell includes two VDD contacts separated by a first one of the discontinuities and built in a same N-type doped region on a substrate of the semiconductor chip, and the two VDD contacts are physically separated from doped material of the N-type doped region.

* * * * *